United States Patent Office 3,832,294
Patented Aug. 27, 1974

3,832,294
ANTI-FERMENTATION AND NEUTRALIZING AQUEOUS SOLUTION FOR THE PURIFICATION OF WATERS, DRINKS AND/OR THE PRESERVATION OF LIQUID OR SOLID FOODS
Marie-Helene Praud nee Durupt, Domaine Sainte-Anne, 85190 Aizenay, France
No Drawing. Filed Jan. 24, 1973, Ser. No. 326,486
Int. Cl. C02b 1/18, 3/06
U.S. Cl. 252—175                                    2 Claims

ABSTRACT OF THE DISCLOSURE

The present invention is directed to an anti-fermentation and neutralizing aqueous solution for the purification of waters, drinks and/or the preservation of liquid or solid foods. The components which are added together to form this solution are carefully selected and measured. These components comprise:

sulfur flour—S—in the amount of 5%;
magnesium oxide (roasted magnesia); MgO=15%;
sodium chloride—NaCl=50%;
20% pure ammonia—$NH_3$=20%;

Dilution in water to provide 1000 cc. The water used is a spring water which is particularly pure and which gushes in a specific location. The solution thus obtained possesses antiseptic, bactericidal properties and is an excellent antidote particularly against arsenious acids. The composition can also be used as a relaxing agent and also as a fertilizing agent when added to the sprinkling water used in gardening.

---

This invention relates to an anti-fermentation and neutralizing aqueous solution for the purification of waters, drinks and/or preservation of liquid or solid foods.

Water pollution is well known and must be deplored. This is why intensive research must be made, which are of the same type as those leading to the preservation of drinks or foods.

Drinking water can be polluted by the presence therein of bodies in suspension which can be of organic or chemical origin.

It is known to purify water by mechanical filtration and/or by the addition of synthetic products which have the property of destroying the microorganisms in suspension therein and/or of chemically acting on the undesirable agents in order to provoke a neutralizing reaction.

Chlorine, ozone, etc., for example, are used as purifying agents, and ordinary salt can be used as a preserving agent, etc.

An object of the present invention is to provide an aqueous solution in which the chemical properties are such that the solution can give remarkable results. The activity of this solution is not restricted to the purification in question because the properties resulting from its composition are numerous. For example, the aqueous solution can have such diversified uses varying from the removal of toxic agents present in a given product to the possibility of producing an over-growth of the plants which are watered with a water enriched with this solution. Other properties which are also worth mentioning include the preservation by destroying fermenting agents and, also the possibility of bringing to the human body a capacity to reduce the muscular weariness which usually happens at the end of the day.

The composition of this solution is following:

|  | Percent |
|---|---|
| Sulfur flour, S | 5 |
| Roasted magnesia, MgO | 15 |
| Sodium chloride, NaCl | 50 |
| 20% pure ammonia, $NH_3$ | 20 |

The mixture is diluted with water to provide 1000 cc.

The water which is used for the above dilution is preferably a spring water which has been collected in a basin where it has arisen after having been filtered through 8 meters of rock. This water is consequently purified and the composition of a typical sample has been verified by the Departmental Laboratory for Hygiene as possessing the following properties:

Physical and micrographic examination:

| | |
|---|---|
| Color | Limpid. |
| Odor | None. |
| Taste | Do. |
| Microscopic examination of deposit | Do. |

Bacteriologic examination:

Bacteria per cm.³ after 48 hours at 37° C. on nutrient gelose _____ 20
Number of indologen germs per liter by the method of Vincent _____ Lower than 20

Chemical examination (potability):

| | |
|---|---|
| Ammonia in mg. $NH_3$ per liter | 0.00 |
| Nitrites in mg. $HNO_2$ per liter | Traces |
| Chlorides in mg. Cl per liter | 78.00 |
| Organic materials in mg. $O_2$ from $KMnO_4$ | |
| In alkali medium | 0.60 |
| In acid medium | X |

Other determinations:

| | |
|---|---|
| pH | 5.45 |
| Total hydrotimetric degree | C__ 24° |
| pH at equilibrium | 7.67 |
| Iron in mg. Fe per liter | 0.92 |
| Tac in French degrees | 7.00° |
| TAC at equilibrium | 8.60° |

Conclusion: drinkable water which is slightly acid.

The new properties resulting from the addition of the above mentioned products which form the composition of the solution are determined by the properties of each component:

sulfur is an expectorant, antirheumatismal, antiseptic and an antipsoric agent. The purifying properties of the solutions are mainly due to the antiseptic and bactericidal properties of sulfur, and the relaxing properties of the solution when the latter is used as a therapeutic agent are due to the antirheumatismal properties themselves.

magnesium oxide: this product is an antiacid agent, when used at small doses; it can also be used as a mild laxative. It can be used as an antidote against acids, and particular arsenious anhydride. It is a strong base.

sodium chloride: because of the presence of sodium, this compound plays a predominant role in the maintenance of the acido-basic equilibrium of the organic liquids, during the metabolism of water in the tissues and cells of the body.

pure ammonia: this compound is combined with the acids to give addition products having properties of the salts.

The percentage of ammonia in the aqueous solution is specially interesting when the latter is incorporated to the spraying water, since in the earth, the ammoniacal compounds are oxygenated and form nitrates which possess fertilizing properties.

When the solution is absorbed, it can lead to a feeling of well being of the body, and its decongesting power is well known.

The solution is therefore prepared using proportions which will enable the properties of each component to confer to the solution a strong influence by modifying the acid content of the spring water, thus arriving at a carefully selected equilibrium.

The following is the analysis of a solution obtained according to the invention:

Physical and micrographic examination:
color: slightly yellowish;
odor: ammoniacal;
taste: ammoniacal;
microscopic examination of deposit: none.

Bacteriologic examination: bacteria or indologen germs: none.

Chemical examination (potability):

| | |
|---|---|
| Ammonia in mg. $NH_3$ per liter | 1,700.00 |
| Nitrates in mg. $HNO_2$ per liter | 0.18 |
| Phosphates in mg. $H_3PO_4$ per liter | 1.80 |
| Chlorides in mg. Cl per liter | 13,000.00 |
| Organic matter | None. |

Other determinations:

pH: 9.68;
total hydrotimetric degree: 44° C.;
resistivity in ohms/cm. at 18° C.: 35;
TAC in French degrees: 291°;
TAC in French degrees: 472°.

I claim:
1. An anti-fermentation and neutralizing aqueous solution for the purification of waters, drinks and/or preservation of liquid or solid foods, comprising:

| | Percent |
|---|---|
| Sulfur flour | 5 |
| Magnesium oxide (roasted magnesia) | 15 |
| Sodium chloride | 50 |
| 20% pure ammonia | 20 |

Balance: water to provide a solution comprising 1000 cc.

2. The aqueous solution according to claim 1 wherein the water of dilution is spring water.

References Cited

UNITED STATES PATENTS

| | | | |
|---|---|---|---|
| 2,728,726 | 12/1955 | Basset | 210—64 |
| 2,855,363 | 10/1958 | Kittredge | 210—59 |
| 2,130,789 | 9/1938 | Campbell | 210—62 |
| 1,235,815 | 8/1917 | Kriegsheim | 210—62 |

RALPH S. KENDALL, Primary Examiner

J. WARE, Assistant Examiner

U.S. Cl. X.R.

252—189, 192, 193, 380; 210—64; 71—64 C, 63